P. H. THOMAS.
ALTERNATING CURRENT VAPOR LAMP.
APPLICATION FILED MAY 11, 1905.

1,110,587.

Patented Sept. 15, 1914.
5 SHEETS—SHEET 1.

Witnesses
Chas. F. Clagett
Wm. H. Capel

Inventor
Percy H. Thomas.
By his Attorney
Charles A. Terry

P. H. THOMAS.
ALTERNATING CURRENT VAPOR LAMP.
APPLICATION FILED MAY 11, 1905.

1,110,587.

Patented Sept. 15, 1914.
5 SHEETS—SHEET 2.

Witnesses
Chas. F. Clagett
Wm. H. Capel

Inventor
Percy H. Thomas
By his Attorney
Charles A. Terry

P. H. THOMAS.
ALTERNATING CURRENT VAPOR LAMP.
APPLICATION FILED MAY 11, 1905.

1,110,587.

Patented Sept. 15, 1914.
5 SHEETS—SHEET 3.

P. H. THOMAS.
ALTERNATING CURRENT VAPOR LAMP.
APPLICATION FILED MAY 11, 1905.

1,110,587.

Patented Sept. 15, 1914.
5 SHEETS—SHEET 4.

P. H. THOMAS.
ALTERNATING CURRENT VAPOR LAMP.
APPLICATION FILED MAY 11, 1905.

1,110,587.

Patented Sept. 15, 1914.
5 SHEETS—SHEET 5.

Witnesses
Chas. F. Clagett
W. H. Capel

Inventor
Percy H. Thomas.
By his Attorney
Charles A. Terry ature, 1,110,587.

UNITED STATES PATENT OFFICE.

PERCY H. THOMAS, OF MONTCLAIR, NEW JERSEY, ASSIGNOR, BY MESNE ASSIGNMENTS, TO COOPER HEWITT ELECTRIC COMPANY, OF HOBOKEN, NEW JERSEY, A CORPORATION OF NEW JERSEY.

ALTERNATING-CURRENT VAPOR-LAMP.

1,110,587. Specification of Letters Patent. Patented Sept. 15, 1914.

Application filed May 11, 1905. Serial No. 259,953.

*To all whom it may concern:*

Be it known that I, PERCY H. THOMAS, a citizen of the United States, and resident of Montclair, county of Essex, State of New Jersey, have invented certain new and useful Improvements in Alternating-Current Vapor-Lamps, of which the following is a specification.

My invention relates to improvements in vapor electric lamps and particularly to lamps of that character which are designed to be used on alternating current circuits.

I have illustrated in the present application various embodiments of the invention as will appear in the present specification.

One object of my invention relates to providing alternating current lamps of the tilting type and also providing means for starting the same into operation.

The various embodiments of my invention will be understood by reference to the accompanying drawings, in which—

Figure 1:
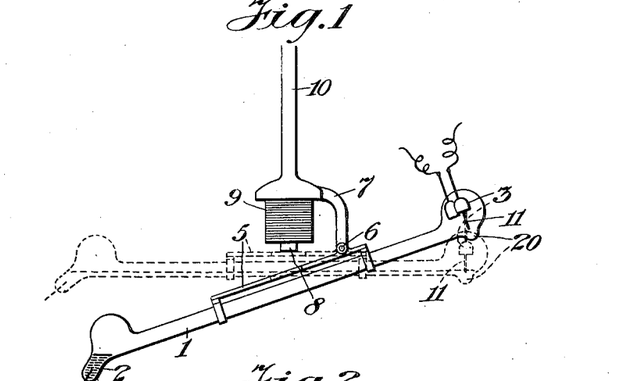
Figures 1, 2, 3, 4, 4ª, 5, 6, 7, 8, 9, 10, 11, 12. 13, 14 and 15 represent different circuits and lamp details.
Figures 2, 3:
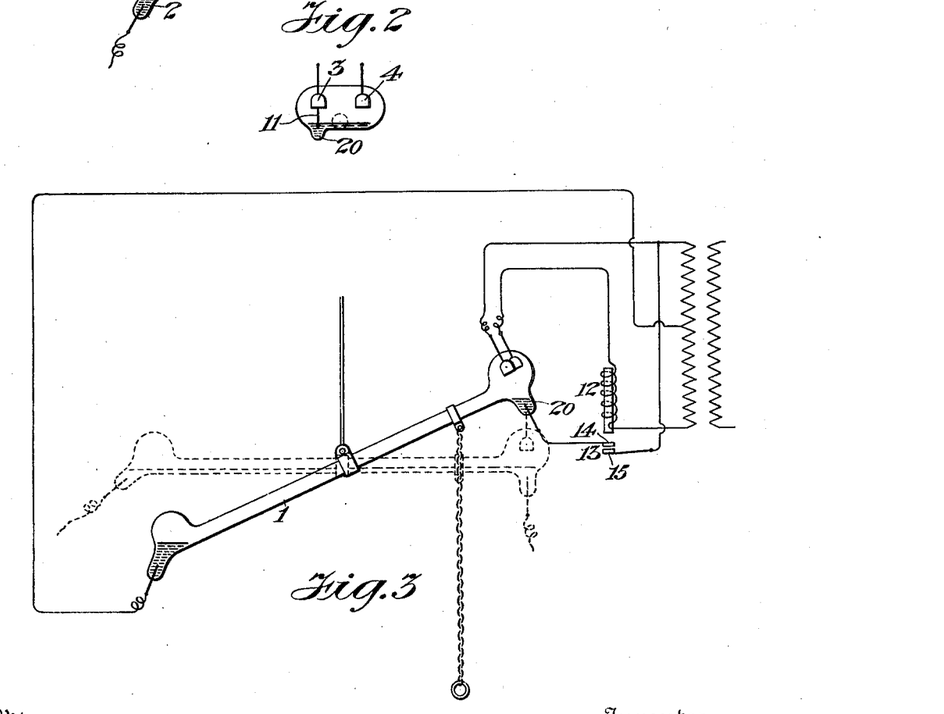

Referring to the first two figures of the drawing, I have here illustrated a simple form of tilting lamp and adapted to be operated by an alternating current, 1 being the container of the lamp, 2 the negative electrode, which may be of mercury, and 3 and 4 the positive electrodes of some solid material, such as iron. The container 1 is connected by a frame, 5, which is pivoted at 6 to a suitable support, 7. The frame 5 carries an armature or core, 8, which is under the influence of a magnet or solenoid, 9, supported by a standard, 10. The operating position of the lamp is shown in full lines in Fig. 1.

The positive electrodes 3 and 4 are connected to the terminals of an alternating current source and the negative electrode 2 to an intermediate point thereof. To one of the positive electrodes, as 3, is connected a conducting piece, 11, which extends downward into proximity to the lower inner wall of a pocket 20, of the container 1.

To start the lamp into operation current is applied through the magnet, 9, to lift the lamp into the dotted position, whereupon mercury flows from the receptacle containing the negative electrode 2 through the main body of the container and into contact with the dependent conducting piece 11. When the magnet has done its work of lifting the lamp as described the circuit of the magnet may be opened by any suitable means. Thereupon the lamp will fall into the full line position illustrated in Fig. 1, the main circuit being assumed in be closed during this period. Should the separation of the mercury in the container take place at a suitable moment for making the electrode 2 the cathode or negative electrode of the apparatus, the lamp may be left to operate in the full line position. Should it happen, however, that the rupture of the mercury circuit in the container takes place at a point in the alternation such as to make the electrode 2 a positive electrode, the operation described will be repeated until the proper relations are obtained.

In Fig. 3 I show means whereby the described operation of tilting the lamp may be performed by hand. The connections here shown to the source may be adopted for use with the apparatus shown in Fig. 1.

The operation of the lamp shown in Fig. 3 will be clearly understood from what has been said respecting Figs. 1 and 2. In both instances, the magnet, 12, may be included in the circuit and placed in such relation to a cut-out, 13, as to draw the movable contact-piece, 14, thereof away from the stationary contact-piece, 15, whereby the circuit to the pocket 20 will be automatically opened when the lamp is brought into operation, thereby permitting the electrodes 3 and 4 to remain as the positive electrodes of the apparatus during operation. The magnet 12 will then remain in the circuit as an inductance device in series with the lamp.

Figures 4, 4A:
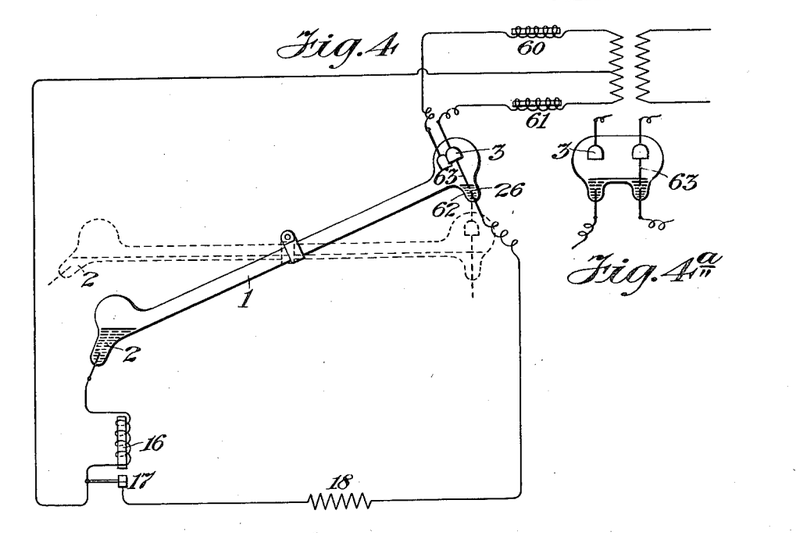

In Fig. 4 an inductance device, 16, placed in operative relation to a cut-out, 17, is included in the circuit extending to the negative electrode 2 and a resistance, 18, is interposed between the cut-out and the mercury in the pocket 20. When the lamp is operating, the resistance 18 is cut-out through the action of the choke coil 16 on the cut-out 17. In this arrangement I show choke coils, 60 and 61, in the leads from the terminals of the source to the positive electrodes 3 and 4. Such choke coils or inductances may be used in connection with the circuits already described. The action of the apparatus shown in this figure is somewhat different from that shown in Figs. 1 and 2 in that the lamp is started initially between a supplemental negative electrode, 62, which coöperates, as shown in Fig. 4ª, with an extension 63, depending from the positive electrode 4 in such a manner as to start the lamp when tilted as already described. Thus the mercury into which the extension 63, passes serves the function of a temporary supplementary positive electrode. The operation then includes the tilting of the lamp in such a manner as to cause a connection, while the current is still operating upon the supplemental negative 62, between the negative electrode 2 and the said supplemental negative. When this occurs, the main current divides, part passing through the electrode 62 and the resistance 18 and the cut-out 17 to the source; the other portion passing through the mercury within the lamp, through the electrode 2, the choke coil 16 to the source. When, now, the connection of the mercury is broken between the electrode 2 and the electrode 62, the electrode 2 or the mercury connected with it becomes a negative electrode and the lamp is started into operation. The flow of current through the lamp resulting from the connection of the negative electrode 2 with the electrode 62 energizes the coil 16 and cuts out the supplemental electrode 62. These operations of starting, with the proper adjustments, will be accomplished at one tilting of the lamp.

Figure 5:
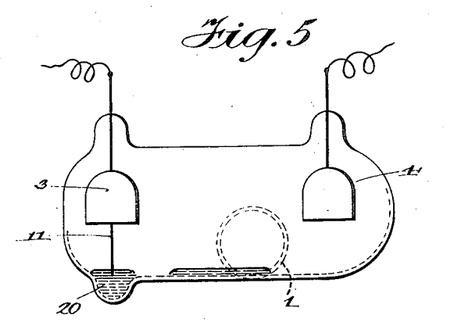

In Fig. 5 I show an end view of a lamp having a somewhat different construction, the said lamp being made operative by being tilted longitudinally as in the preceding cases and also by being rocked somewhat during the tilting motion. The means for accomplishing these two motions are illustrated in connection with Figs. 7, 8 and 9. The object of the construction shown in Fig. 5 is to insure that the actual rupture inside the container shall take place between mercury surfaces and not between mercury and a metal. In this figure, 3 and 4 are the positive electrodes; 1 the container; 20 a pocket, normally containing a certain quantity of mercury; and 11 a projection from the positive electrode 3 connecting with mercury in the pocket 20. Mercury in flowing down the tube into the head makes contact with the mercury in the pocket 20 or the extension 11 of the positive as already described in connection with the preceding figures and this connection is finally broken between the mercury and the pocket 20 and the mercury column through which connection was originally made.

Figure 6:
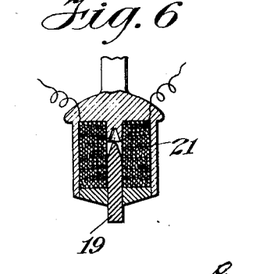

In Fig. 6 I illustrate a convenient form of magnet or solenoid for accomplishing the tilting of the apparatus. Here the core, 19, is so related to the coil, 21, as to provide a practically uniform pull as the core is moved inward.

Figures 7, 8:
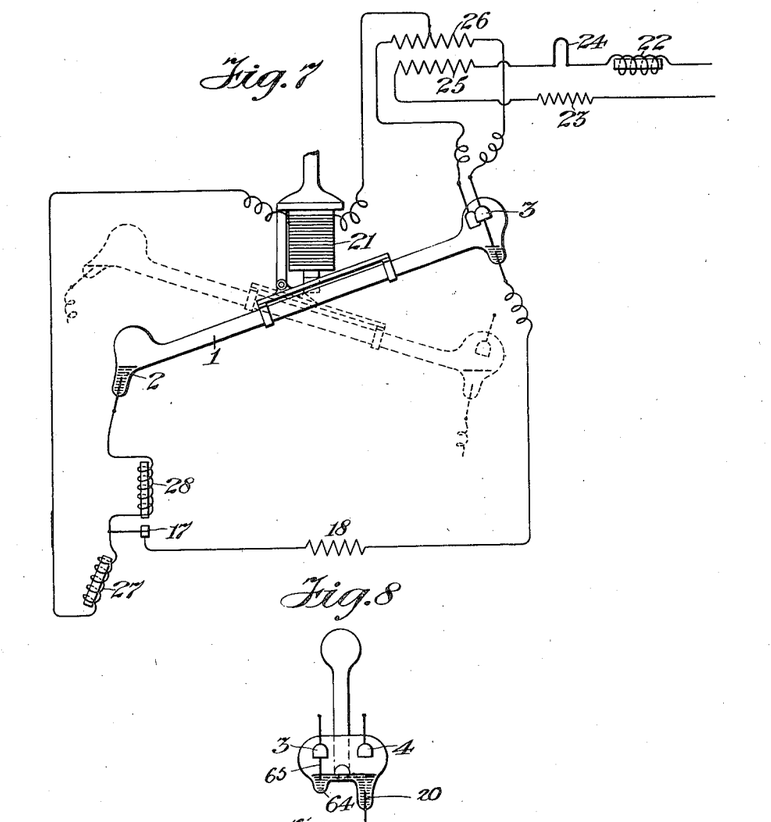

Referring to Fig. 7 I place an inductance, 22, and a resistance, 23, in the leads to the primary and in one of these leads I also insert a ballast device, 24. The location of the ballast 24, the inductance 22 and the resistance 23 in the primary of the transformer, instead of the secondary circuits, has the advantage of simplicity and comparative effectiveness, since, if single devices corresponding are located in the secondary circuit, they must be located in the lead from the cathode to avoid unbalancing in which position they do not tend to control short circuiting which is a well known function of limiting devices located where they must be traversed by the short circuit currents. The primary is shown at 25 and the secondary at 26. The terminals of the secondary are connected as before to the positive electrodes 3 and 4 and an intermediate point of the secondary is joined through the magnet 21 and inductance device 27 and 28 to the negative electrode 2. Besides the features mentioned the special feature of this apparatus is that of tilting the container in a longitudinal direction and at the same time giving to it a rocking motion. This is accomplished by means of the arrangement illustrated in Fig. 9, where the armature 29 is shown as being connected with a lever pivoted eccentrically as shown at 30 and 31 in Fig. 9 and so arranged that the container 1 supported by the armature is both lifted and rocked. This results in a separation of the mercury at a point underneath the electrode 4 as shown in Fig. 8.

Figure 9:
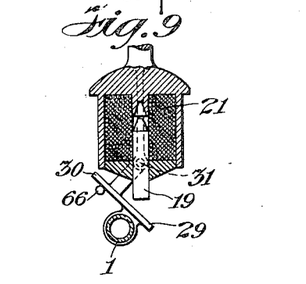

It is to be understood that when the container 1 is in the non-operating position, as shown in dotted lines, the head at the positive end of the lamp is in practically the position shown in Fig. 8, in which position the mercury extends across from the pocket 20 to a pocket, 64, under the electrode 3, so that an electrical connection exsists through the lamp from the positive electrode 3 and the mercury in the two pockets named. Into the last named pocket extends a lead, 65, which is connected by way of the pocket 20 as already described, through the resistance 18 and the cut-out 17 to the middle point of the secondary 26. Accordingly, when the main circuit is closed, the magnet 21 is energized and begins to exert a pull upon the lamp through its armature 29. It will be seen that the lever, 30, rests upon a stop, 66, and that the initial action of the magnet would naturally tend to lift the said lever from this stop were it not that the weight of the lamp tends to shift the latter, as the container is raised by the magnetic pull, toward the right as seen in Fig. 9. This causes a separation of the mercury connection between the mercury in the pockets 20 and 64, and, if at the time of the break the mercury in the pocket 20 is negative, the positive electrodes 3 and 4 coöperate with the mercury in the pocket 20, causing a permanent local discharge between the said positives and the mercury as a negative. If, however, the separation occurs at a time when the mercury in the pocket 64 is the negative in view of the connections to the circuit, the current ceases to flow in an alternation or so and the magnet 21 becomes deënergized and the lamp returns to its original position. Thus the pocket, 64, operates as a supplemental positive electrode and the pocket 20, as a supplemental negative electrode. As soon, however, as the mercury closes the connection between the pockets 64 and 20, the above operation is repeated and will be repeated as described until finally a permanent discharge is set up. As soon as this condition occurs the magnet 21 will continue the lifting and tilting of the container until the mercury runs from the pocket 20 to the main negative electrode 2. As connection is established between these electrodes current will be transferred to the negative electrode 2 and the electrode 20 be cut-out of circuit through the action of the coil 28 and the cutout 17, as already described in connection with Fig. 4.

Figure 10:
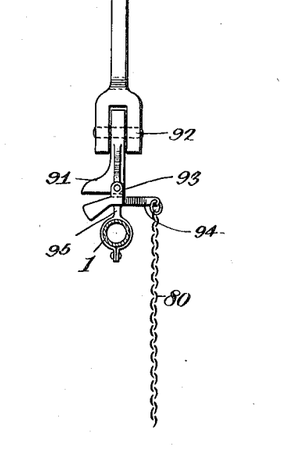
Figure 11:
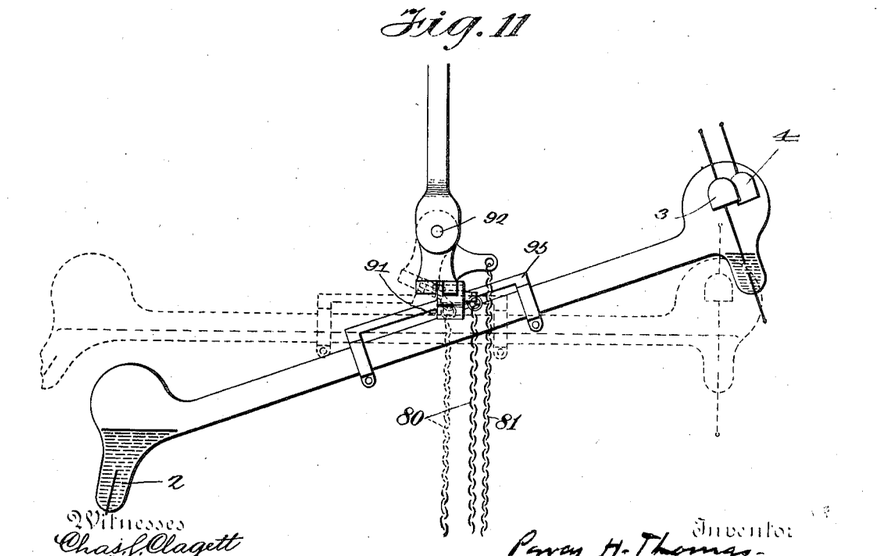

Figs. 10 and 11 illustrate mechanical means for accomplishing the double motion described in connection with Figs. 7, 8 and 9.

In the apparatus shown in these figures the rocking is accomplished by a depending cord or chain, 80, connected to a lifting arm, 94, extending at one side from the frame, 95, supporting the lamp, as shown in Fig. 10, a stop, 91, being provided to limit the rocking of the lamp. The tilting motion is accomplished by a second chain or cord, 81, depending from the frame, 95, supporting the lamp in such a position as that shown, for example, in Fig. 11. In the rocking motion the lamp tube and frame 95 are pivoted at 93; while in the tilting motion these parts together with the part carrying the stop 91 are pivoted at 92 in a plane at right angles to the first mentioned pivoting. Starting is then accomplished by pulling the cord 81 and throwing a portion of the mercury into the positive end of the lamp, then rocking the lamp by the cord 80 so that contact is made and broken between the mercury in the pockets 64 and 20, which motion is continued, as already described, until a permanent discharge is established between the positive electrodes 3 and 4 and the mercury in the pocket 20. Tension is then released on the rocking cord and subsequently the tilting cord is released causing the mercury to bridge the connection between the pocket 20 and the negative 2, thus transferring the negative as already described in connection with Fig. 4. The lamp is suspended in such a manner that the natural tendency will always be under the influence of gravity to restore the lamp to the position illustrated in full lines in Fig. 11.

Figures 12, 13, 14:
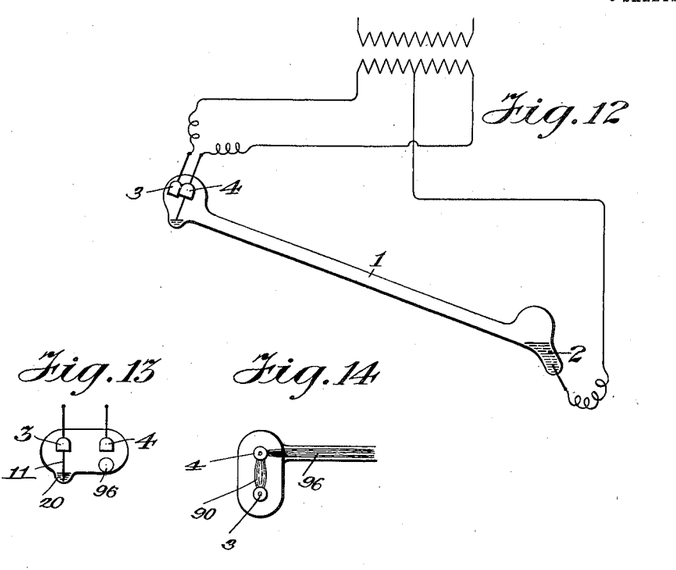

Figs. 12, 13 and 14 illustrate a type of alternating current lamp in which the rupture for starting the lamp into operation takes place immediately under and close to one of the positive electrodes. This arrangement greatly facilitates the starting of the lamp and is, therefore, of advantage. In these figures, 3 and 4 are the positive electrodes; 2, the negative electrode; and 1, the container of the lamp. The positive electrode 4 is located directly opposite the light giving tube 96, while the positive electrode 3, which coöperates with the mercury pocket 20 through the extension of the positive electrode 11, is placed at one side. In general, the operation of Figs. 12, 13 and 14 is similar to the operation of Figs. 1 and 2. The mercury in streaming from the negative electrode 2 to the pocket 20 passes around a corner under the electrode 4 which causes a tendency for the initial break to occur at this point. For the instant, then, the operating positive electrodes are the portion of the mercury column 90 in contact with the positive electrode 3, and the positive electrode 4, and the negative electrode is the long tip of the mercury column remaining in contact with the negative electrode. All these elements are thus in very close juxtaposition, which is a favorable condition for the initial establishment of current in such an apparatus.

Figure 15:
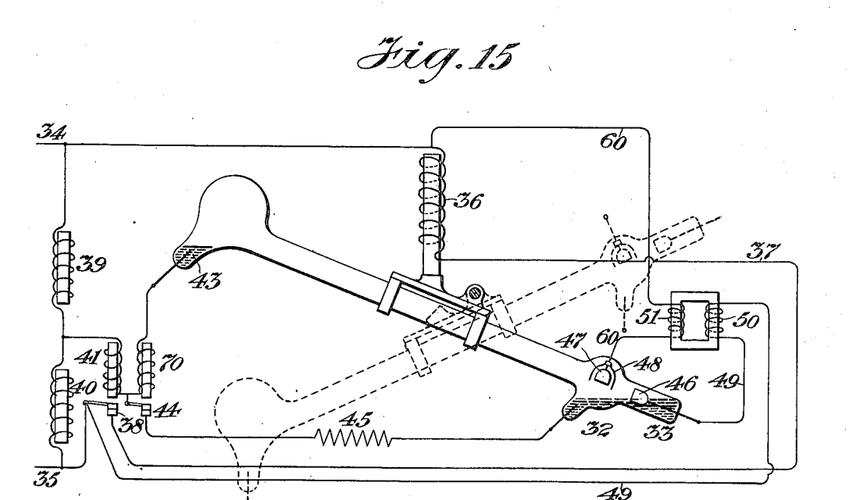

In Fig. 15 I show a modified form of circuits to be used in connection with an alternating current lamp. In the first instance the mercury puddles, shown at 32 and 33, are out of contact and when the circuit of the mains 34 and 35 is closed, current passes through the lifting magnet, 36, and by way of the wire or conductor, 37, to a cut-out, 38, and back to the line. Between the mains are connected two choke coils, 39 and 40, and a point intermediate between the choke coils is connected through two magnets, 41 and 70, to the negative electrode, 43, of the lamp. The magnet 41 is in operative relation to the cut-out 38 while the magnet 70 is in operative relation to a cut-out, 44, in a circuit leading to the puddle 32 through a resistance, 45. The electrode 46 is connected by a wire, 49, to one of the mains 35 through a coil, 50, while the electrode 48 is connected by a wire, 60, through a coil, 51, in inductive relation to the coil 50, to the other main 34.

The magnet 36 being energized tilts the lamp from the operating dotted position to the full line or non-operating position where there exists a connection between the positive electrode 46 and the mercury in the pocket 32. Current then flows from the main 35 through the coil 50, the electrode 46, the mercury in the pocket 32, the resistance 45, the cut-out 44, the magnet 41, through the coil 39 to the source. This current in passing through the magnet 41 operates the cut-out 38 and deënergizes the coil 36 allowing the container to begin to drop and causing a separation between the pocket 32 and the electrode 46. This separation, may or may not initiate a permanent discharge between the positive electrodes 46 and 47 and the mercury in the pocket 32 as already described. In case it does not, the magnet 36 will again become energized and repeat its action until such permanent discharge be established. This discharge will act permanently through the coil 41 upon the cut-out 38 deënergizing the magnet 36 and allowing the container to drop by gravity to its operating position transferring in this operation the negative electrode from the mercury of the pocket 32 to the negative electrode 43 through the agency of the coil 70 acting on the cut-out 44, as described in connection with Fig. 4.

I show a shield, 48, surrounding the electrode, 47, to assist in preventing short-circuits between the positive electrodes.

The magnets 70 and 41 remain in the circuit as inductive resistances.

In a divisional application filed October 5th, 1911, Serial Number 652,990, claims are made to certain other features of the invention claimed herein.

I claim as my invention:—

1. A mercury vapor lamp comprising a movable container for mercury, a plurality of positive electrodes in said container, and a negative electrode therein, the said electrodes being included in the main operating circuit of the lamp, and means operated by the main current adapted to move the said container so as to make and break metallic connection between the negative electrode and at least one of the positive electrodes, such means comprising a magnet coil in series with the lamp.

2. A vapor electric lamp having multiple positive electrodes and a conducting liquid negative electrode, a transformer having its primary connected with a source of alternating current and its secondary suitably connected to the said electrodes, in combination with a ballast device in the primary circuit.

3. A vapor electric lamp having multiple positive electrodes and a conducting liquid negative electrode, a transformer having its primary connected with a source of alternating current and its secondary suitably connected to the said electrodes, in combination with an inductance in the primary circuit.

4. A vapor electric lamp having multiple positive electrodes and a conducting liquid negative electrode, a transformer having its primary connected with a source of alternating current and its secondary suitably connected to the said electrodes, in combination with a ballast device and an inductance in the primary circuit.

5. In a mercury vapor apparatus operated from an alternating current source, including an exhausted container and electrodes therefor, and adapted to be started by connection and disconnection of the electrodes, the combination of circuit connections for the passing of current initially through the container from the source, and automatic means energized by the source for tilting the container.

6. In connection with a mercury vapor apparatus adapted to be started by connection and disconnection between electrodes through motion of the container, the combination of an alternating current source, and connections from the source to the mercury vapor apparatus, coöperating electrodes therein, with a magnet adapted to move the container energized from the source.

7. In connection with a mercury vapor apparatus adapted to start by tilting of the container and consequent separation of electrodes, the combination of an alternating current source, a movable mercury vapor device, coöperating electrodes therefor, connections between the source and the device, means energized from the source for continually tilting the container upon the application of voltage, and means for discontinuing such tilting means during normal operation of the device.

8. In a vapor electric apparatus supplied from an alternating current source and adapted to be started by tilting, the method of operation, which consists in repeatedly breaking within the container an initial current from the source automatically through energy derived from the source and discontinuing such action during normal operation.

9. In a mercury vapor apparatus, the combination of an exhausted container, a plurality of electrodes, including at least two positive electrodes of solid material and a negative electrode of liquid material, with an extension of one of the positives adapted to coöperate with the liquid of the negative during movement of the container, together with means for moving the container.

10. In a mercury vapor apparatus, the combination of an exhausted container, a plurality of electrodes, including at least two positive electrodes of solid material and a negative electrode of liquid material, with an extension of one of the positives adapted to coöperate with the liquid of the negative during movement of the container, and a pocket for said extension, together with means for moving the container.

11. An alternating current vapor lamp comprising a light giving tube, and a head at one end at right angles thereto containing a plurality of solid positive electrodes and a fluid cathode at the other end.

12. In a mercury vapor apparatus, having the positive electrodes separated from the negative electrode, a supplementary electrode located in relative proximity to the positive electrodes, and a cut-out in the lead to the supplemental electrode.

13. In a mercury vapor apparatus having the positive electrodes separated from the negative electrode, a supplementary electrode located in proximity to the positive electrode, and a cut-out in the lead to the supplemental electrode, and means whereby, through the action of the supplementary electrodes, the extinguishment of the lamp is prevented.

14. In an alternating current mercury vapor apparatus, the combination of an exhausted container, a negative electrode, a plurality of positive electrodes located relatively distant from said negative electrode, and starting means within the container in close proximity to the positive electrodes.

15. In an alternating current mercury vapor apparatus, in which a plurality of positive electrodes are located relatively distant from the negative electrode and adapted to start by contact of electrodes, the method of operation, which consists in temporarily extending the negative electrode within the container into the vicinity of the positive electrode.

16. In a mercury vapor apparatus adapted to be started by separation of electrodes, the combination of a liquid negative electrode, a solid positive electrode, and a liquid extension to the solid positive electrode, and means for causing initial separation to occur between said extension and the liquid electrode.

17. In connection with a mercury vapor apparatus adapted to be operated from an alternating current source, the combination of an exhausted container, a liquid negative electrode therein, a plurality of positive electrodes, and a supplementary electrode, with a connection including resistance between the supplementary electrode and the negative electrode, and means for shunting this connection within the container.

18. In an alternating current mercury vapor apparatus, a negative electrode, a plurality of positive electrodes relatively remote therefrom, a supplementary negative electrode in proximity to the positive electrodes and connected through an external resistance with said negative electrode, together with means for making and breaking connection between the negative and supplementary negative within the vacuum chamber.

19. In an alternating current mercury vapor apparatus, a negative electrode, a plurality of positive electrodes relatively remote therefrom, a supplementary negative electrode in proximity to the positive electrodes and connected through an external resistance with said negative electrode, together with means for making and breaking connection between the negative and supplementary negative within the vacuum chamber, and a cut-out in the circuit of the supplementary negative.

20. In an alternating current mercury vapor apparatus, the combination of a negative electrode, a plurality of main electrodes, with at least one supplementary negative electrode and at least one supplementary positive electrode.

21. In a mercury vapor electric apparatus adapted to be started by movement of the container and requiring an initial starting operation and a subsequent transfer of current, the combination of means for moving the container to produce an initial starting, with means for producing a second motion for completing the transfer operation.

22. In a mercury vapor apparatus adapted to be started by tilting the container and requiring a transfer of current for starting, the combination of means for producing an initial motion adapted to start the device with means for producing a second motion in a different plane to the first for completing the starting operation.

23. In a mercury vapor apparatus adapted to be started by tilting the container and requiring a transfer of current for starting, the combination of means for producing an initial motion adapted to start the device with means for producing a second motion in a different plane to the first for completing the starting operation, and means whereby the first named motion may be periodically repeated until the initial starting is complete.

24. In an alternating current mercury vapor apparatus naturally remaining out of its operating position and adapted to start by mechanical motion, the combination of automatic means energized from the alternating current supply for obtaining repeated movement of the container, with means for arresting said motion upon the normal starting of the device.

25. In a mercury vapor apparatus naturally remaining out of the normal operating position and adapted to be started by mechanical motion, the combination of means for obtaining repeated motion for purposes of starting, and means for moving said apparatus to operating position for completing the starting operation.

26. In an alternating current mercury vapor apparatus adapted to be started by mechanical motion, the combination of means for moving the container out of its operating position, means for producing subsequent starting movements, with means for restoring the operating position upon the completion of starting operation.

27. In an alternating current mercury vapor apparatus adapted to be started by mechanical motion, the combination with means for producing mechanical motions for starting purposes, with means for moving the apparatus from the natural resting position to the normal operating position on the completion of the starting operation.

28. In a vapor electric apparatus adapted to be started by movement of the container, the combination of means for producing a limited motion for starting purposes with means for producing a continued motion for bringing the apparatus into its normal operating position.

Signed at New York, in the county of New York, and State of New York, this 8th day of May, A. D. 1905.

PERCY H. THOMAS.

Witnesses:
Wm. H. Capel,
George H. Stockbridge.